United States Patent
Joye et al.

(10) Patent No.: US 10,616,653 B2
(45) Date of Patent: Apr. 7, 2020

(54) METHOD AND APPARATUS FOR INHIBITING THE INTERRUPTION OF CONTENT BEING CONSUMED BY A USER

(71) Applicant: InterDigital CE Patent Holdings, Paris (FR)

(72) Inventors: Marc Joye, Palo Alto, CA (US); Azin Ashkan, San Jose, CA (US); Jaideep Chandrashekar, San Francisco, CA (US); Alvita Tran, Pasadena, CA (US); Akshay Pushparaja, Mountain View, CA (US); Swayambhoo Jain, Sunnyvale, CA (US); Shi Zhi, Urbana, IL (US); Junyang Qian, Stanford, CA (US)

(73) Assignee: InterDigital CE Patent Holdings, Paris (FR)

( * ) Notice: Subject to any disclaimer, the term of this patent is extended or adjusted under 35 U.S.C. 154(b) by 0 days.

(21) Appl. No.: 16/066,817

(22) PCT Filed: Dec. 31, 2015

(86) PCT No.: PCT/US2015/068227
§ 371 (c)(1),
(2) Date: Jun. 28, 2018

(87) PCT Pub. No.: WO2017/116455
PCT Pub. Date: Jul. 6, 2017

(65) Prior Publication Data
US 2019/0020923 A1    Jan. 17, 2019

(51) Int. Cl.
| | |
|---|---|
| *B60R 21/00* | (2006.01) |
| *H04N 21/472* | (2011.01) |
| *H04N 21/414* | (2011.01) |
| *H04N 21/214* | (2011.01) |
| *H04H 20/62* | (2008.01) |
| *H04N 21/422* | (2011.01) |
| *H04N 21/488* | (2011.01) |

(Continued)

(52) U.S. Cl.
CPC ...... *H04N 21/47217* (2013.01); *H04H 20/62* (2013.01); *H04N 21/2146* (2013.01);
(Continued)

(58) Field of Classification Search
CPC ......... H04N 21/47217; H04N 21/2146; H04N 21/41422; H04N 21/4882; H04H 20/62; H04H 20/106; H04H 60/33; H04H 60/65
See application file for complete search history.

(56) References Cited

U.S. PATENT DOCUMENTS

| | | |
|---|---|---|
| 4,276,572 A | 6/1981 | Hayashi et al. |
| 6,929,218 B1 | 8/2005 | Sanford et al. |

(Continued)

FOREIGN PATENT DOCUMENTS

| | | |
|---|---|---|
| EP | 278717 | 8/1988 |
| GB | 2496452 | 5/2013 |
| WO | WO11044148 | 4/2011 |

OTHER PUBLICATIONS

International Search Report for PCT/US2015/068227 dated Aug. 19, 2016.

*Primary Examiner* — Munear T Akki
(74) *Attorney, Agent, or Firm* — Jerome G. Schaefer; Lily Neff

(57) ABSTRACT

The present disclosure provides a method (1100) and apparatus (702) for inhibiting the interruption of the content being consumed by a user that is provided by an entertainment system. The method (1100) and apparatus (702) of the present disclosure may detect an interruption event and determine, based on the current state of a user, whether the interruption event matches the current state of the user. If the method (1100) and apparatus (702) of the present disclosure determine that the interruption event does not match the current state of the user, the method (1100) and apparatus (Continued)

(702) of the present disclosure may inhibit the interruption of the content being consumed by the user.

34 Claims, 11 Drawing Sheets

(51) Int. Cl.
*H04H 60/65* (2008.01)
*H04H 20/10* (2008.01)
*H04H 60/33* (2008.01)

(52) U.S. Cl.
CPC . *H04N 21/41422* (2013.01); *H04N 21/42201* (2013.01); *H04N 21/4882* (2013.01); *H04H 20/106* (2013.01); *H04H 60/33* (2013.01); *H04H 60/65* (2013.01)

(56) References Cited

U.S. PATENT DOCUMENTS

| | | | |
|---|---|---|---|
| 8,220,579 B2 | 7/2012 | McCoy | |
| 8,613,385 B1* | 12/2013 | Hulet | B64D 11/0015 |
| | | | 235/375 |
| 8,776,149 B1 | 7/2014 | Koch et al. | |
| 10,282,423 B2* | 5/2019 | Ohyama | B64D 11/00151 |
| 2008/0068220 A1 | 3/2008 | Giesa et al. | |
| 2009/0062990 A1 | 3/2009 | Materna et al. | |
| 2010/0162325 A1 | 6/2010 | Bonar | |
| 2011/0186374 A1* | 8/2011 | McCoy | B60R 21/00 |
| | | | 180/268 |
| 2016/0381412 A1* | 12/2016 | Couleaud | H04N 21/4316 |
| | | | 725/46 |
| 2017/0144773 A1* | 5/2017 | Raman | B64D 45/00 |
| 2018/0217984 A1* | 8/2018 | Ohyama | B64D 11/00151 |

\* cited by examiner

METHOD AND APPARATUS FOR INHIBITING THE INTERRUPTION OF CONTENT BEING CONSUMED BY A USER

This application claims the benefit, under 35 U.S.C. § 365 of International Application PCT/US2015/068227, filed 31 Dec. 2015, which was published in accordance with PCT Article 21(2) on 6 Jul. 2017 in English.

TECHNICAL FIELD

The present disclosure generally relates to entertainment systems, and more particularly, to a method and apparatus for inhibiting the interruption of content being consumed by a user.

BACKGROUND

Satellite television is television delivered via communication satellites, as opposed to "terrestrial television" (e.g., conventional radio wave broadcast signal television and cable television). Satellite television services often provide a wider range of channels and services than terrestrial television, including subscription-only services. Satellite television, like other communications relayed by satellite, starts with a transmitting antenna located at an uplink facility. A satellite receiver demodulates and converts the signals from the satellite to the desired form (outputs for television, audio, data, etc.) for playback to the subscriber.

Direct broadcast satellite (DBS) is a term used to refer to satellite television broadcasts which can cover both analog and digital television and radio reception, including video-on-demand and interactive features. A "DBS service" can refer to a commercial service or a group of free channels available from one orbital position targeting one country. One example of a DBS service is DirecTV™, which transmits digital satellite television and audio. In addition to residential consumers, satellite television services can be offered to businesses (such as bars, restaurants, hotels, dorms, and hospitals). A mobile service can be offered for cars, boats, and recreational vehicles (RVs), and satellite service for aircraft can be offered as well.

Pause functions are well known in devices such as VCRs. For example, if the audio/video source is a VCR tape or tapes, a pause can be implemented by simply pressing the pause button on the VCR and then pressing "play" when an interruption period is ended to resume playback of the program(s). This form of pause typically does not require any special design techniques. However, providing a pause of real time digital streaming of hundreds of channels, such as found in an airplane satellite system, presents a challenging problem. This is compounded by the fact that typically a viewer is normally not in control of the video/audio program, other than being able to select content from what is available.

SUMMARY

According to one aspect of the present disclosure, a method is provided including providing content to be consumed by a user, detecting an interruption event, determining a current state of the user, determining if the interruption event matches the current state of the user, and inhibiting the interruption of content being consumed by the user if the interruption event does not match the current state of the user.

According to another aspect of the present disclosure, an apparatus is provided including a content receiver that receives content to be consumed by a user from at least one source, and a controller coupled to the content receiver, wherein the controller provides content to be consumed by the user to an output circuit that outputs the content to the user, detects an interruption event, determines a current state of a user, determines if the interruption event matches the current state of the user, and inhibits the interruption of content being consumed by the user if the interruption event does not match the current state of the user.

BRIEF DESCRIPTION OF THE DRAWINGS

In the drawings, wherein like reference numerals denote similar elements throughout the views.

Figure 1:
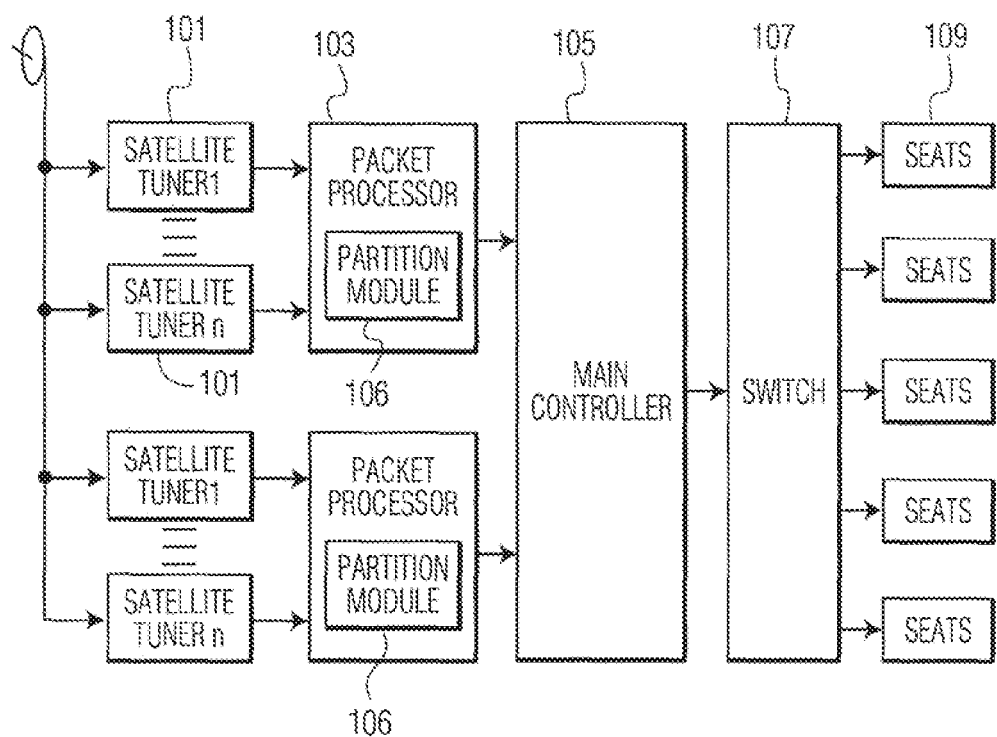
FIG. 1 is an exemplary illustration of a system that provides a global program pause function in accordance with an embodiment of the present disclosure.

It should be understood that the drawings are for purposes of illustrating the concepts of the present disclosure and are not necessarily the only possible configurations for illustrating the present disclosure.

DETAILED DESCRIPTION

It also should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

In accordance with various embodiments of the present disclosure, a method, apparatus and system are described for providing a system-wide or "global" pause function, namely, for simultaneously pausing multi-channel broadcast multimedia content broadcast to a plurality of viewers in real time. While the present disclosure can be applicable to any broadcast television system, the examples herein are described in relation to, e.g., an inflight entertainment system in which media content is displayed to passengers either individually, e.g., in seat-back displays, or in groups, e.g., via a plurality of displays distributed throughout the passenger cabin. Generally, most system providers provide systems with individual controls since people generally desire independence in controlling programming content. However, passengers on trains, buses, taxis, theaters, and especially airplanes, tend to be captive audiences. Any public announcements made in such environments are typically pertinent to all the viewers/passengers and thus, a system-wide pause feature in accordance with the present disclosure is especially desirable and useful. In another aspect of the present disclosure, a method and apparatus are provided for inhibiting the interruption of content being consumed by a viewer/passenger by an interruption event, such as an announcement during a global pause if the announcement does not match the current state of the viewer/passenger.

It is to be noted that each receiver (e.g., a set top box of an inflight entertainment system) can be configured for local storage and allow individual user-enabled "local" pause functions (e.g., to allow each user to activate a pause mode to pause content at a user-desired time), as will be described below. However, according to one aspect of the present disclosure, a "global" or universal pause feature is further provided which does not require user activation and minimizes storage requirements for each set top box receiver. Note also that a global pause function (e.g., a pause function next to the tuners) as according to an aspect of the present disclosure advantageously allows users/viewers to change content and/or channels during the flight without encountering problems such as loss of data created with previous pauses. For example, a local pause function at each viewer's set top box would typically cause the loss of data whenever a channel change occurs after a pause has been implemented. The loss of data would be the time equal to the sum all of the pauses up to the point of channel change.

Advantageously, an apparatus, system and method according to the present disclosure provides a streamlined and efficient manner in which to prevent loss of video/audio programming content playing during an "interruption period", e.g., periods during which the program content is paused to make, e.g., public announcements on-board to viewers/passengers, e.g., by the pilot, driver, flight attendant, etc. Further, the apparatus, system and method avoids complexity and minimizes the amount of memory needed, thus reducing costs. In one aspect, a "universal" pause function is provided, in which a pause feature can be implemented at a main controller for automatically storing content from a plurality of channels in real-time during an interruption period. Accordingly, once an interruption period is ended, each viewer can enjoy continued viewing of media content from the point at which the interruption period commenced and will not miss any of the content during the interruption period's interim, regardless of what channel each individual viewer was watching and without having to manually activate any controls.

Referring now to the figures, FIG. 1 is an exemplary illustration of a system for providing a global program pause function in, e.g., an inflight entertainment system of an aircraft according to an embodiment of the present disclosure. A plurality of tuners 101 (e.g., tuners (1-*n*)) can be provided, each tuner being configured to receive and process media signals via, e.g., a satellite. Each tuner 101 or a group of tuners (1-*n*) is connected to a network or packet processor 103 configured to process packet data transferred from each tuner 101. Multiple packet processors 103 can be provided. Packet processors 103 can include certain features and/or architectures to enhance and optimize packet processing, such as pattern matching (the ability to find specific patterns of bits and/or bytes within packets in a packet stream), data bit field manipulation (the ability to change certain data fields contained in the packet as it is being processed), and queue management (as packets are received, processed and scheduled to be sent onwards, they are stored in queues).

Figure 2:
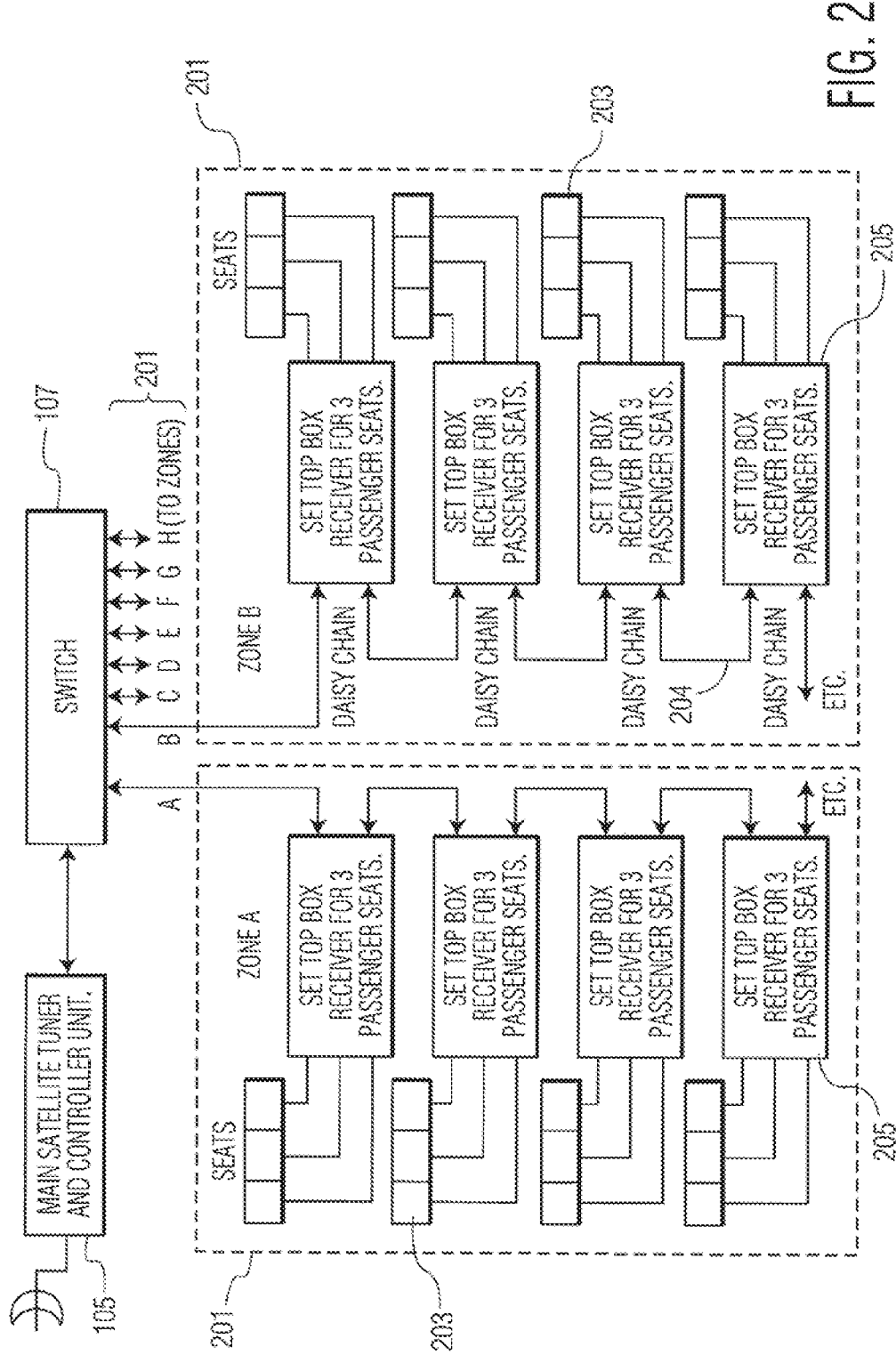
FIG. 2 is an exemplary signal distribution layout for a broadcast television system in, e.g., an aircraft in accordance with an embodiment of the present disclosure.
Figure 3:
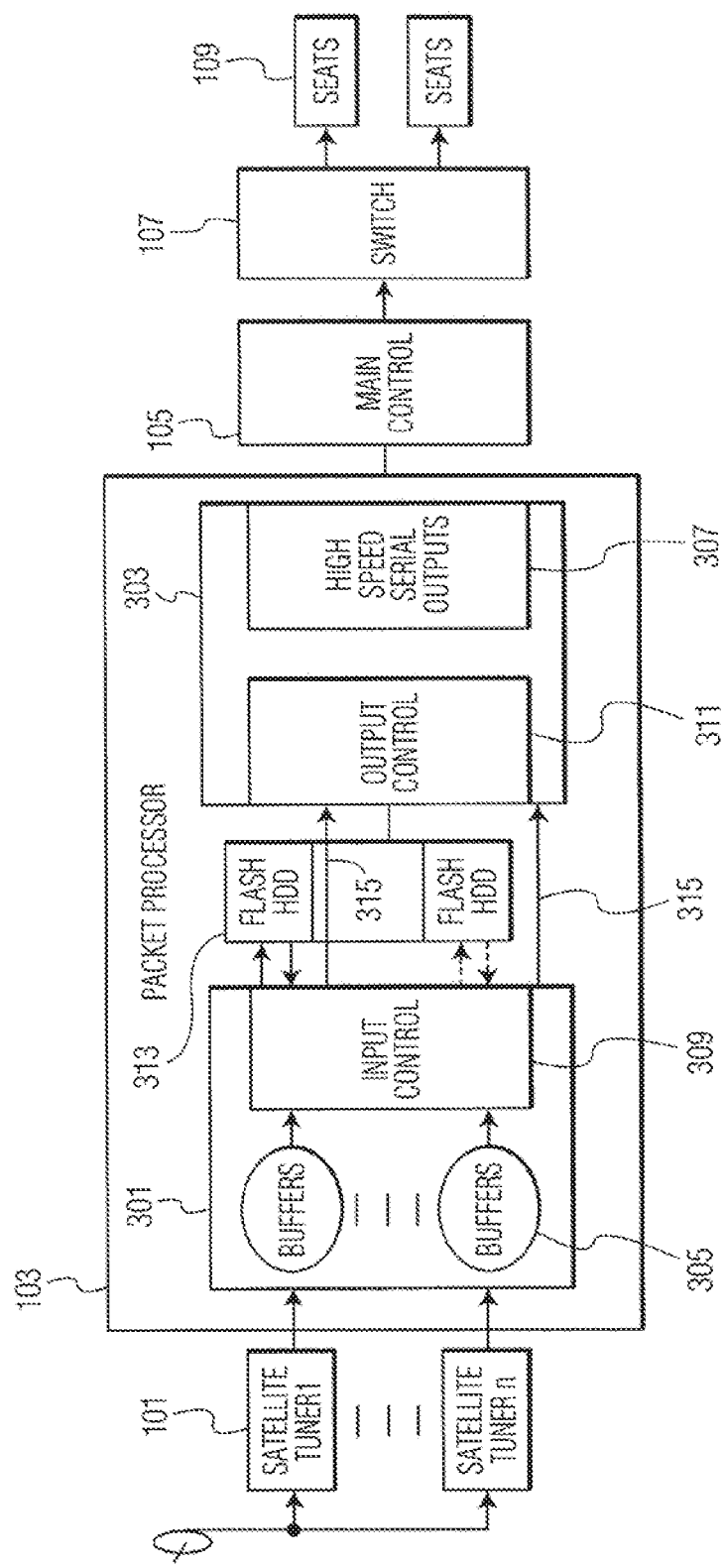
FIG. 3 is an exemplary illustration of a packet processor configured for providing a global pause function in accordance with an embodiment of the present disclosure.

Each packet processor 103 includes a partition module 106 functionally connected to a memory device 313 (shown in FIG. 3). Each processor 103 is connected to a main controller 105, which itself is connected to and controlled by a switch 107. The switch 107 can be configured for controlling signal output to a number and/or grouping of, for example, seats 109 (e.g., a plurality of seating 'zones' as described further with reference to FIG. 2).

FIG. 2 is an exemplary signal distribution layout for a satellite television system in an aircraft according to an aspect of the present disclosure. A main tuner/controller unit 105 is connected to a switch 107 (e.g., an 8 port 1000 base T switch). Switch 107 can be configured for distributing signals to a plurality of zones 201, e.g., zone A, B, C, D, E . . . etc. Each zone 201 can include a set top box (STB) receiver 205 which can be functionally connected to a plurality of seat monitors 203. For example, one STB receiver 205 can be connected to a row of three seats 203, as shown in FIG. 2, although any number of seats per receiver can be contemplated. For example, each STB 205 can be connected to each other via a "daisy chain" wiring scheme (electrical bus) configuration 204.

Figure 4:
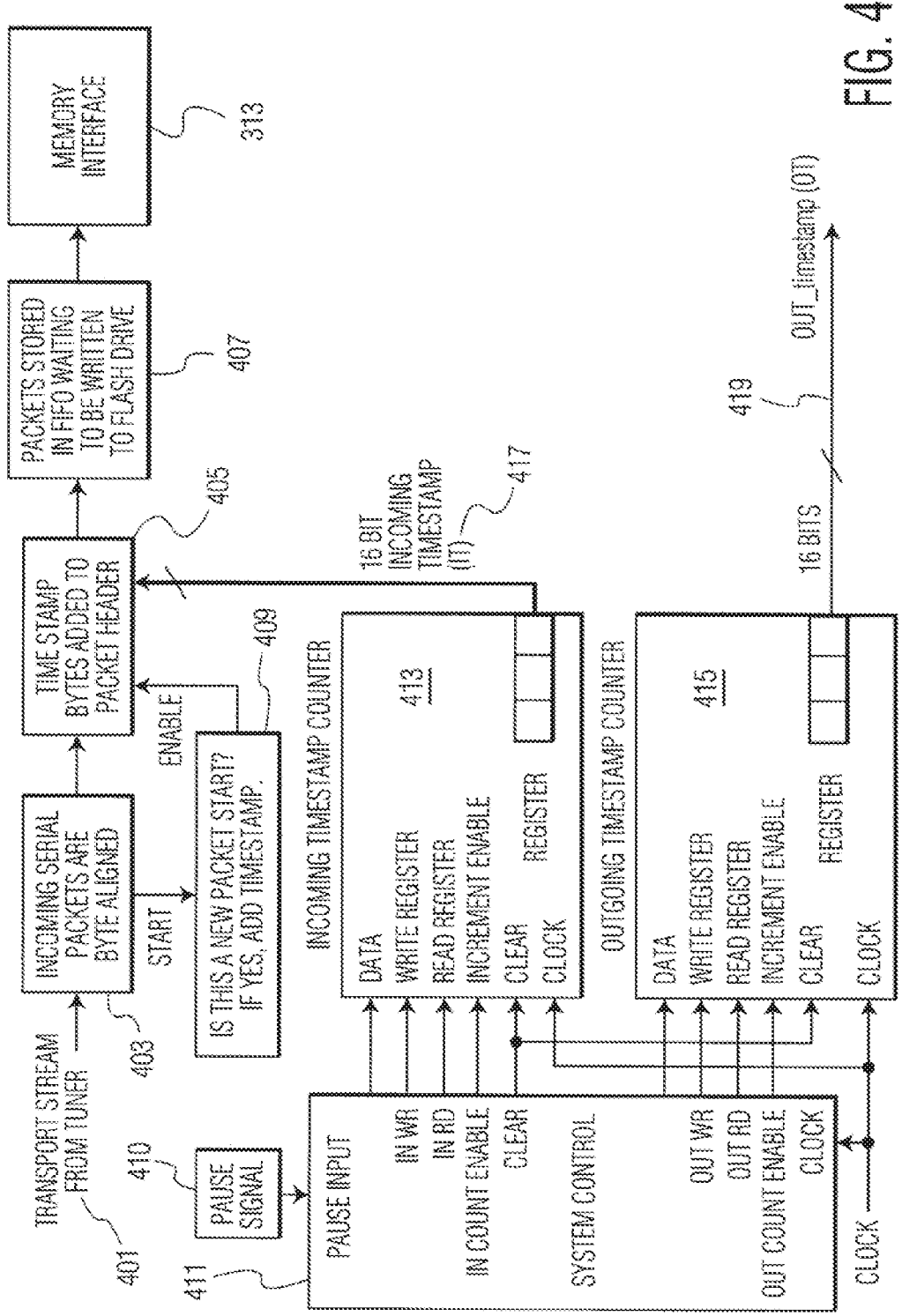
FIG. 4 is an exemplary method flow for global program pause processing at an input side in accordance with an embodiment of the present disclosure.
Figure 5:
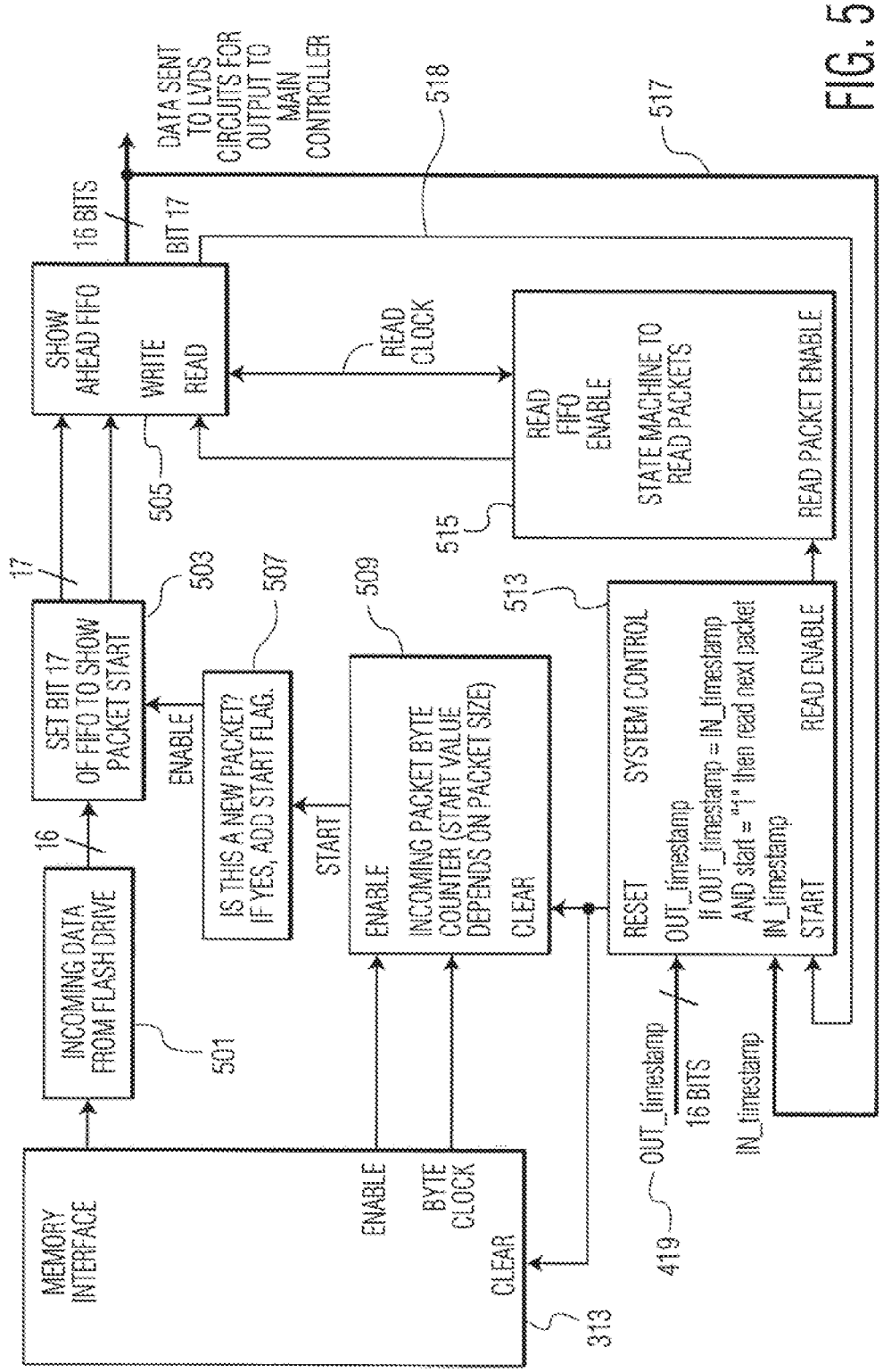
FIG. 5 is an exemplary method flow for global program pause processing at an output side in accordance with an embodiment of the present disclosure.

FIG. 3 is an exemplary illustration of a packet processor 103 configured for providing a global pause function, e.g., in an inflight entertainment system according to an aspect of the present disclosure. FIGS. 4-5 depict exemplary method flow steps for program pause processing at an input side 301 and an output side 303, respectively, of the packet processor 103 according to an aspect of the present disclosure.

The processor 103 can include a capture/input module 301, a memory 313 and an output module 303 each in functional communication with one another. The capture module 301 and output module 303 can include a plurality of buffers 305 (not shown in module 303), which can preferably comprise, e.g., first-in-first-out (FIFO) buffers configured to process data such that the first data to be added to the queue is the first data to be removed, and processing proceeds sequentially in the same order. It is noted that the buffers 305 can also be included in the output control 311 of module 303. Other buffer hierarchy strategies besides FIFO can also be implemented.

The memory 313 can comprise any memory device, such as a hard disk drive (HDD), and/or preferably a non-volatile, solid-state memory device such as flash memory, which can be a more durable, efficient and suitable storage media, especially in high-altitude environments where air pressure might fluctuate, such as in airplane cabins. Since the majority of interruption periods, e.g., during a flight, can comprise announcements lasting only a minute or two, a minimum amount of memory is needed to cover a minimal system. Preferably, the memory 313 has storage capacity of, e.g., at least about 45 Mb/s for each transponder (an exemplary system setup can comprise, e.g., 32 tuners tracking 32 transponders). As broadcasted media standards change, the minimum recommended storage can change as well. Current technology is requiring more and more data to be sent for higher definition signals. However, there could be future inventions that might reduce the required amount of data. Thus, the recommended storage capacity is highly dependent on system, structure, and/or media content and the like.

Incoming data transport streams are input from tuners 101 to the buffers 305 for processing by the input module 301. The input module 301 can include an input controller 309, which itself can comprise at least a system control 411, an incoming timestamp counter 413, and an outgoing timestamp counter 415, as shown in FIG. 4. The incoming timestamp counter 413 adds marker values/timestamps to incoming packets to register and acknowledge when packets are received and to improve data flow. For example, the incoming timestamp counter 413 is configured for marking when each incoming packet arrives from the tuner (e.g., by applying a time-based marker value to each incoming packet) and the outgoing timestamp counter 415 provides time-based marker values for each outgoing packet.

For example, as incoming serial packets are received they are byte aligned (step 403), and if it is determined that there is a new packet start, a timestamp is added (step 409), preferably to the packet header (step 405). In addition, step 409 can include flagging the packet with an extra "start bit" to show when a packet begins. An exemplary timestamp can comprise, e.g., a 16 bit counter with a known clock reference that can be reset, programmed, or pre-loaded by the system controller. For example, a time reference about equal to ½ of the minimum single packet delivery time (about 16 to 18 μs) can be used as the time stamp clock reference.

For example: Consider a 27 MHz clock reference that takes 1/27,000,000=37 ns per bit. Packets of 130 bytes*8 bits/byte=1040 bits. 37 ns*1040=38.5 μs per packet. It is desirable to mark packets at least within one packet time so, for example, select ½ of a packet time which is about 19 μs so the frequency is 1/(19 μs), which is about 53 kHz. As an estimate, use 2^10=1024 bits and take half of this as 512 which is 2^9. Therefore, for example:

Clock reference/(bits/packet)/2=27 MHz/130*8/2=27 MHz/520=about 52 kHz

Note that the addition of timestamps can result in the addition of extra data to each packet. For example, whenever a start bit is found, two bytes of timestamp data can be added to the packet header. The time-stamped packets are then sent to the buffer 305 (step 407) and on to the memory 313 for storage. As an example, an unstamped packet can comprise 130 bytes versus a time-stamped packet at 132 bytes.

In one embodiment, the software (e.g., processor 103) can build and store a navigation table/register using set intervals of time to contemporaneously record the IN_timestamp and the memory address in memory 313 where this data starts. This register can be used to keep track of where data is found in memory 313 with respect to its timestamp. This enables very quick access to the desired data once a known delay or pause period is defined.

The outgoing timestamp counter 415 provides the output timestamps. Note that the OUT_timestamp counter 415 can be analogous in configuration and operation to the IN_timestamp counter 413. The outgoing timestamp counter 415 can use the same type of counter and same clock reference as the input timestamp counter 413, but the specific outgoing timestamp value is typically equal or less than the incoming timestamp counter. This is because the outgoing counter 415 provides the timestamp for the memory access that represents the time that the viewer is watching. When a global pause occurs (i.e., pause mode/period begins), the outgoing counter 415 is stopped until the pause period is ended. This pause in the counting means the outgoing count/marker value normally is lower than the incoming count value. The outgoing counter reference with a lower value than the input counter reference indicates that the value is further back in time, which tracks the location of the start of the pause feature in the time domain.

The outgoing counter 415 is configured to be able to be reset, programmed, and/or pre-loaded by the system controller 411. Both counters 413, 415 are cleared at the start of the media service and begin counting, e.g., by setting both count enables high. The IN_timestamp counter 413 is constantly counting/marking incoming packets independent of a pause mode (i.e., regardless of whether the system is in a pause mode or non-pause mode) since it provides the timestamp/marker value for incoming data. The OUT_timestamp counter 415 also counts and follows the IN_timestamp counter 413, but stops incrementing/counting whenever a global pause mode is enabled.

A system and method according to the present disclosure can provide a processor 103 configured to constantly watch and check for activation/triggering of a global pause signal 410. If a global pause signal 410 occurs, thus enabling a global pause mode, the input system control 411 stops the OUT_timestamp counter 415 from 'incrementing' (e.g., marking with further successive time-based marker values) for the duration of the global pause period/mode. One primary difference between the use of the counters 413, 415 is the offset in the OUT_timestamp counter 415 that is used to provide a real time output reference for the stored data. That is, when a pause period is over, the output timestamp counter 415 is referenced by an output program in the output controller 311 to find the corresponding input timestamp bytes that were captured when the packets arrived from the input counter 413. This output counter reference can comprise, e.g., the input timestamp counter minus the number of counts that represent the equivalent delay of the pause period. In one exemplary embodiment, the number of counts of the pause period can be programmed into the output counter 415 by the input system control 411.

Advantageously, by stopping the output counter 415 from incrementing during the pause period, the dataflow operation becomes automatic without requiring controller intervention. The system controller 411 can also read the output counter and then can add or subtract values from the OUT_timestamp counter 415 if repeated data and/or skipped data is desired. The output then starts counting again to provide the appropriate output timestamp reference until the next pause mode occurs. Note that if the output counter stops incrementing, the output data also stops since the incoming data timestamps are greater than the value being looked for.

For example, in the timeline shown below (i.e., Example 1) depicting an exemplary period of 20 minutes of streaming data content, a 5 minute pause period occurs starting from minute 10 to minute 15. While the data input continues to be written throughout the entire 20 minutes, at 10 minutes, the data output (i.e., reading) is stopped and the outgoing timestamp counter/marker value is noted. When the pause period is over at minute 15, the output counter searches for the output timestamp counter value (minute 10) in the input time-stamped data to resume playback starting from minute 10. Note that after the pause, the next packet of data output is the one following the last packet sent before the pause. The primary purpose of the timestamp counters is to ensure that the original transmission bit rate is maintained to avoid, for example, MPEG buffer overflows or underflows.

EXAMPLE 1

|  | 0 min . . . | 10 min | (pause start) | 15 min(pause end) |  | 20 min. |
| --- | --- | --- | --- | --- | --- | --- |
| In count: | 0 . . . | 10 | . . . | 15 | . . . | 20 . . . |
| Out count: | 0 . . . | 10 | . . . | 11 12 13 | . . . | 15 . . . 20 |

The input controller 411 is configured for both writing and reading the streaming data to or from memory 313. Details of the read and write operations and signals of the memory controller and interfaces are well known in the art and are not shown in FIG. 4 or 5. Note that in all cases, the controller 411 is configured to continuously write incoming streams to the memory 313. Even during a pause period, although the system is not reading (outputting) the data from the memory 313, incoming data is still needed to be written. When the pause period is over and playback is resumed, both reading of the playback data and writing of the incoming data are simultaneously performed.

As illustrated in FIG. 5, the output module 303 can include at least an output controller 311 which can comprise at least an output system control 513, state machine 515, a buffer 505, and an output circuit 307. The output system control 513 can include a comparator module 513 configured to check the incoming timestamps 517 of the data coming from memory 313 versus the desired timestamp to ensure that the bit buffers downstream do not overflow during media processing. As described above, for example, an additional bit in the FIFO can be used to flag the beginning of every packet to help count bytes as well as flag the timestamp in each packet.

In one exemplary embodiment, the start of each new packet sets a bit to indicate the start of a packet (step 409) along with the added timestamp. This control bit can then be sent to the FIFO buffer (step 407) to be written into the flash interface 313. Adding, e.g., an additional bit is an efficient method to mark the timestamps bytes and packet starts to reduce the amount of overhead logic. This "start" bit that indicates a packet start and timestamp can continue with the packet through the memory 313 and be monitored by the new packet 507 and show packet start 503 blocks. In this exemplary embodiment, the start flag 518 enables the comparison of the IN_timestamp 517 of the packet 505 with the output of the OUT_timestamp counter 419 to hold the data until the timestamps match. The additional 'start' bit helps automate the flow of the data and reduces the amount of control logic.

In one embodiment, each packet processor 103 can include a delay/pause partition module 106 for each tuner 101 so that when the data is played back, the system downstream can react the same. That is, each pause partition 106 can be found in a corresponding packet processor(s) 103. The partition module 106 can be embodied in the memory 313.

If the tuners are combined in the memory, then the tuners have channels with timestamps that could be equal, e.g., 8 or 16 tuners have 8 or 16 channels with timestamps that could be equal. If the tuners are combined into a common stream to the memory (e.g., flash and/or HDD) then extra data needs to be added to identify which packet came from which tuner. This can be done in the packet processor 103. There can be one packet processor per tuner or one packet processor per system serving N number of tuners.

However, in an embodiment using partitions 106, keeping the transport streams separated in the memory (e.g., flash/HDD) (e.g., via the pause partitions) advantageously simplifies the system and can be implemented by storing one tuner's output in its own packet on the memory (e.g., flash/HDD), storing the next tuner's output in another packet, and so on. In this embodiment the difference is the packet management and not the bandwidth utilized for a defined system. The final architecture can be chosen based on bandwidth requirements versus the cost of the overhead for each additional packet processor.

A global pause control signal 410 can be provided so that the system can be notified when an interruption period is starting (e.g., an announcement is being made) and a pause function can accordingly be activated. According to one aspect, the packet processor 103 is configured to constantly check for activation of the global pause signal 410 during data delivery, and activate the global pause mode in response to triggering of the signal 410. Triggering/activation events for the global pause signal 410 can comprise, e.g., manual activation of a global pause button, or an automated activation due to an announcement being made to the viewers which necessitates the full attention of the viewers.

In one embodiment, a multiplexer can be added (e.g., see 315 in FIG. 3) to the system, to enable switching between either real time or stored (i.e., paused) content from the memory 313. For instance, guide packets can be passed in real time to the receivers to maintain appropriate real time clock references versus the paused clock references. This multiplexer can also be used for live video and audio feeds from the cockpit during the pause modes to allow the data flow.

FIG. 5 shows the output side of a global pause processing method according to one aspect of the present disclosure. When the interruption period/pause delay is known, the navigation table can be used to find the proper read address for the data. Note that during this entire time, the incoming data is being stored in the memory without interruptions. The desired data 501 is streamed from the memory 313, and each new packet is marked with a start flag (step 507). That is, each start of a packet can be marked on an additional bit (step 503) and sent to the "Show-ahead" FIFO (505). For example, in the case of a 16 bit packet, one additional bit (e.g., bit 17) can be added. A "show ahead" type of FIFO places the data for the next read on the output bus so that only a read is required to latch the FIFO data value. In addition, this ensures that the timestamp can be found whenever the start bit (i.e., bit 17 in this example) is equal to "1".

The system does not read the next packet of data from the FIFO until the system controller/comparator 513 compares the OUT-timestamp 419 with the IN-timestamp 517. In this example, when the start flag is equal to "1" and the OUT and IN-timestamps are equal values, the next packet will be read. This re-creates the original bit-rates found when the data was initially received, which avoids overflow of the media buffers downstream. Once the values are equal, the state machine 515 enables the read for an entire packet. The state machine 515 stops the data flow again until the IN_timestamp 517 (e.g., found in the header data stored in the flash memory) is less than or equal to the OUT_timestamp 419.

Figure 6:
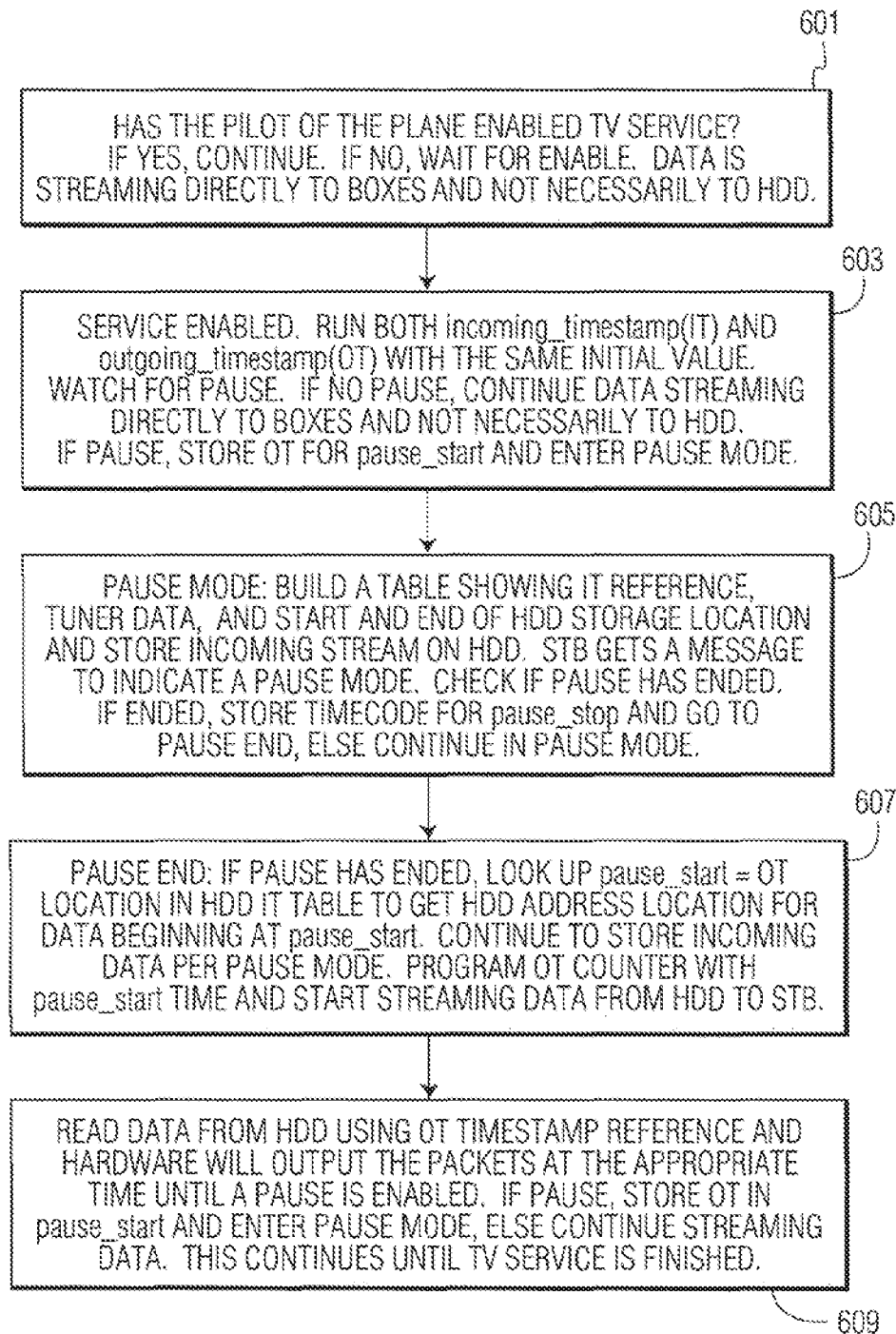
FIG. 6 is an exemplary flow diagram of a method for providing a global pause function in a broadcast multimedia system in accordance with an embodiment of the present disclosure.

FIG. 6 is an exemplary flow diagram of a method for providing a global system pause function in a broadcast multimedia system according to an aspect of the present disclosure. In step 601, the system is waiting to be enabled (e.g., for the television service to be activated or on). In step 603, the packet processor sets both incoming and outgoing timestamp counters equal and watches for a pause or interruption period to occur.

If a pause occurs, a pause mode is enabled (step 605) and the outgoing timestamps (OT) are stored. During the pause mode a reference table is preferably created showing, e.g., incoming (IT) timestamps, tuner data, and start and end flash/HDD storage locations. The incoming data stream is preferably stored in the memory 313. In one exemplary embodiment, each user set top box (STB) can receive a message to indicate a pause mode, e.g., each STB can receive another data stream with a still picture, on-screen display (OSD), or a picture freeze with overlay to indicate a pause mode. During the pause mode, the system constantly checks to see whether the pause has ended. If the pause is stopped/ended, the time codes (e.g., counter/marker value) and end address corresponding to the pause stop time are stored, and the system proceeds to step 607.

In step 607 ("pause end"), the OT counter is programmed with the pause_start location and data is streamed from the memory 313 to each set top box (e.g., receiver). That is, the navigation table is referenced to find the starting address for the IT time code/marker value equal to the pause_start location, and the data is then read from the memory 313 between the start and end addresses. For example, if the pause has ended, the processor looks up pause_start=OT location in the stored IT table to get memory address location for data beginning at the pause_start. The next HDD read is found as the next table entry, and so on.

Step 609 continues the streaming using the OT as the timestamp reference while the incoming data is marked with the IT counter. If another pause occurs, the OT register value at pause_start is stored and a pause mode is entered again (back to step 605) until the pause mode ends (step 607). The above steps continue until a pause is encountered again or the TV service is ended (step 609).

Playing back content that is regulated by the timestamps/marker values ensures that the original transport bit rates are being reconstructed on the output data from the memory 313. These original bit rates were carefully constructed at the transmitters to be sure that the media bit buffers do not overflow and/or underflow during the decoding of the transport streams. This is also why the use of solid state flash can be advantageous over HDD magnetic disc drives in the present application, since the HDDs can have large variations in access times for reading and writing data while flash drives do not.

Although in the above-described embodiments content is provided to the users sitting in seats 109 as supplied via satellite tuners 101, it is to be appreciated that the present disclosure also contemplates inflight entertainment systems that provide locally stored content to users on an aircraft. For example, in one embodiment, content, such as, but not limited to, music, movies, television programming, e-books, videogames, etc., is stored in a media content database coupled to controller 105, where users sitting in seats 109 may select content to consume from the database. In another embodiment, the media content database is coupled to STBs 205. Also, it is to be appreciated, that in some embodiments of the present disclosure the inflight entertainment system also includes the option for users to couple media stored in portable media storage devices, such as, but not limited to, USBs, to the inflight entertainment system and for users to consume content stored on a user's portable media storage device during a flight.

As stated above, a global pause may be initiated by the aircraft crew to provide information relevant and/or important for all users to hear and/or see. When a global pause is initiated, the content provided to each user in a seat 109/203 is interrupted while an announcement is made by the aircraft crew. However, there are certain circumstances that a particular announcement may not be relevant to all the users of an aircraft based on a user's current state. For example, an announcement for a user to wear his/her seatbelt is not relevant for a user that is already wearing his/her seatbelt. The present disclosure addresses this problem and provides a method and apparatus for inhibiting an interruption event, such as a global pause to deliver an announcement to users on an aircraft, if the interruption event is not relevant to the user based on the user's current state, as will be described in greater detail below. The present disclosure advantageously allows a user to continue to consume content during a flight when an announcement being administered is not relevant to that user based on the user's current state.

Figure 7:
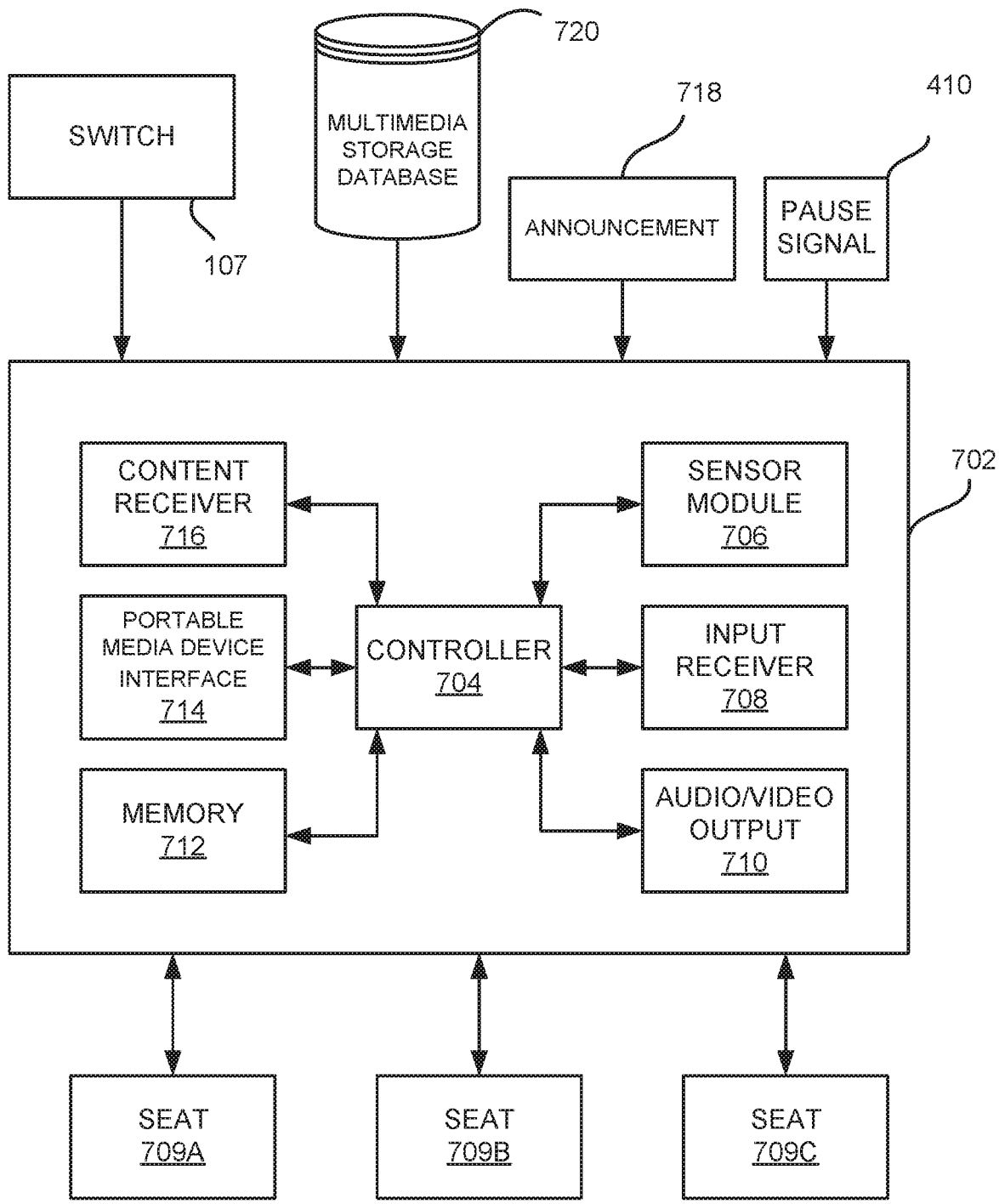
FIG. 7 is a block diagram of a set top box in accordance with an embodiment of the present disclosure.

Referring to FIG. 7, an exemplary set top box 702 is shown in accordance with the present disclosure, where set top box 702 may be coupled to the displays of one or more seats 709 to provide content to users in an aircraft. It is to be appreciated that in certain embodiments, set top box 702 may be the same as set top box 205 and seats 709 may be the same as seats 205, described above.

As seen in FIG. 7, set top box 702 includes a controller 704 coupled to a sensor module 706, input receiver 708, audio/video output 710, memory 712, portable storage interface 714, and content receiver 716. Content receiver 716 is configured to receive content to be provided to one or more users. As stated above, the content may include content received from one or more satellite tuners 101 (as described above in reference to FIG. 1) and provided to set top box 702 via switch 107 or content stored locally on the aircraft in a media storage database 720. It is to be appreciated that switch 107 and media storage database 720 may be coupled to set top box 702 via hardwired connection or wirelessly. It is also to be appreciated that media storage database 720 may include any type of video, audio, and/or text based media, such as, but not limited to, movies, television shows, books, games, music, etc. Set top box 702 is also configured to provide content stored on a user portable media storage device via portable media storage interface 714. A user may couple his/her portable media storage device to set top box 702, where portable media storage interface 714 is configured to interface a user's portable media storage device to set top box 702. Content provided to set top box 702 is sent to controller 704 via content receiver 716 and/or portable media storage device interface 714, where controller 704 can provide the content to one or more users sitting in seats 709A, B, and/or C via audio/video output 710. Users sitting in seats 709A-C may choose content to watch via user inputs provided to user input receiver 708. User inputs may be provided to user input receiver 708 via a touchscreen or media controller device, as will be described in greater detail below.

Content receiver 716 is also configured to receive a pause signal 410 (as described above, to initiate a global pause) and an announcement signal 718 to be delivered to the users/passengers in the aircraft via controller 704 and audio/video output 710. Also, as will be described in greater detail below, controller 704 is configured to determine if the content being consumed by a user, such as a user sitting in one of seats 709A-C should be interrupted based on inputs received by user input receiver 708 and sensor module 706 relating to a user's current state.

It is to be appreciated that memory 712 may be any type of memory for storing information and instruction code for controller 704. For example, memory 712 may be any of volatile or non-volatile memory, including random access memory, static RAM, dynamic RAM, read only memory, programmable ROM, flash memory, EPROM, EEPROM, etc.

Figure 8:
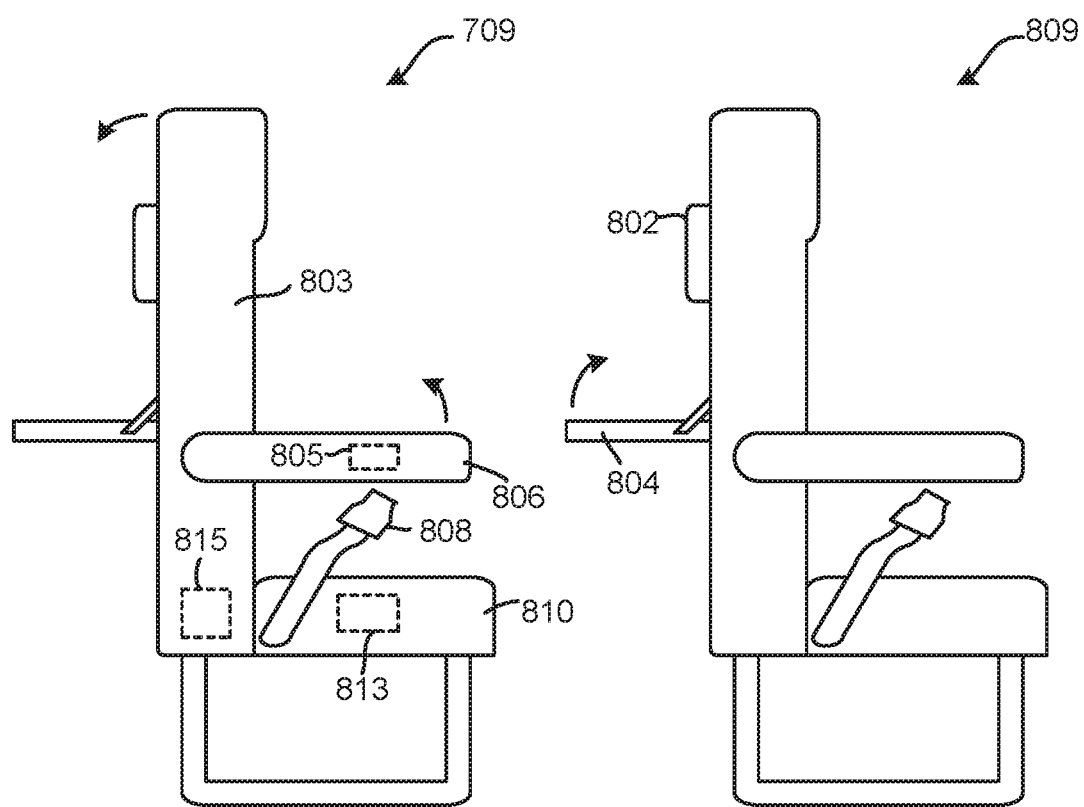
FIG. 8 is a side view of two exemplary seats on an aircraft in accordance with an embodiment of the present disclosure.

Referring to FIG. 8, side views of seats 709 and 809 are shown in accordance with an embodiment of the present disclosure. It is to be appreciated that seat 709 may be any one of seats 709A-C. Seat 709 is disposed behind seat 809. Seat 709 includes a back rest 803, an armrest 806, a seatbelt 808, and cushion 810. Back rest 803 is configured such that back rest 803 can be reclined a predetermined amount by a user sitting in seat 709 and subsequently brought back to an "upright position" as shown in FIG. 8. Additionally, arm rest 806 is configured such that the arm rest can be in a position generally perpendicular to back rest 803 (as shown in FIG. 8), i.e., a "lowered position," to allow a user to rest his/her arm on arm rest 806 or arm rest 806 can be lifted by a user to achieve a position generally parallel to back rest 803, i.e., a "raised position."

Figure 9A:
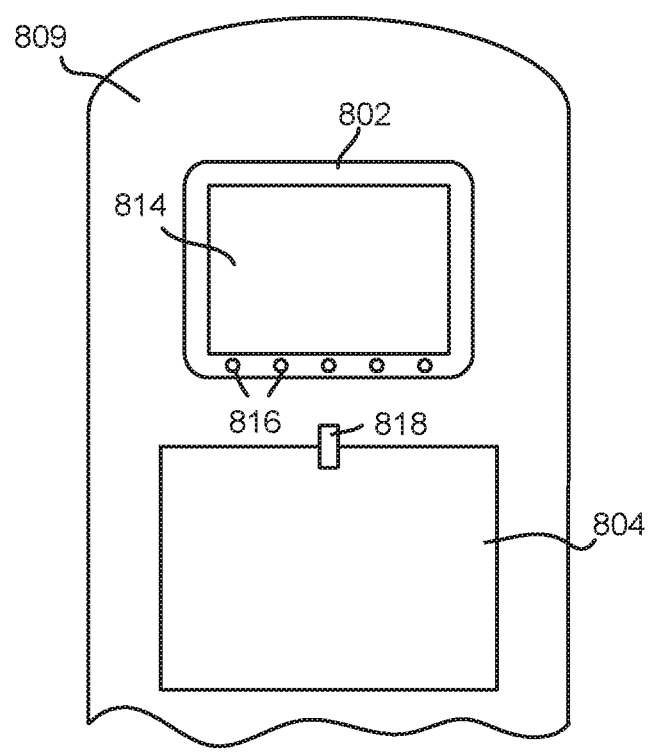
FIG. 9A is a partial view of a rear portion of a seat on an aircraft in accordance with an embodiment of the present disclosure.

In one embodiment, a user sitting in seat 709 can consume content via media device 802, disposed on the rear portion of seat 809, as shown in FIG. 8. Referring to FIG. 9A, a rear view of a portion of seat 809 is shown in accordance with the present disclosure. As seen in FIG. 9A, media device 802 is shown, where media device 802 includes a screen or display 814 and a plurality of buttons 816. In one embodiment, display 814 is a touchscreen configured to display content provided via set top box 702 and to receive user inputs to navigate a user interface. It is to be appreciated that buttons 816 may also be used to navigate the user interface. It is to be appreciated that user inputs using touchscreen 814 and/or buttons 816 are provided to set top box 702 via input receiver 708. The rear portion of seat 809 also includes a tray 804 that is configured such that the tray 804 may be lifted to achieve a lifted position generally parallel to back rest 803 and lowered to achieve a lowered position generally perpendicular to back rest 803. In one embodiment, tray 804 is held in the lifted position by a latch 818, as shown in FIG. 9A.

Figure 9B:
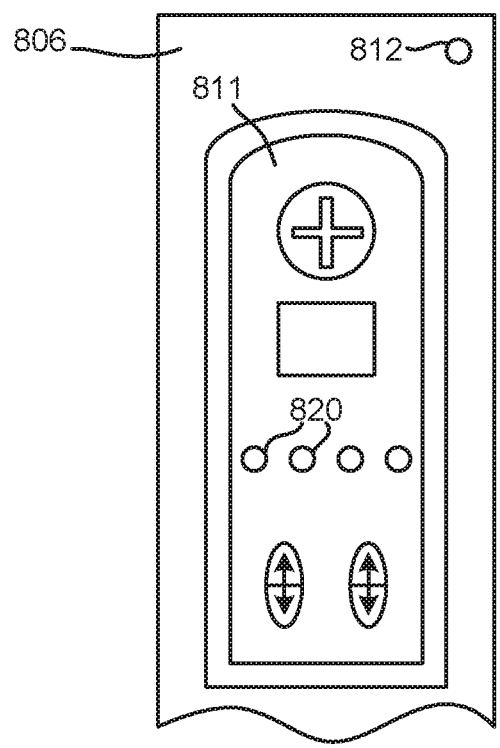
FIG. 9B is a partial view of an armrest of a seat on an aircraft in accordance with an embodiment of the present disclosure.

Referring to FIG. 9B, arm rest 806 is shown in greater detail in accordance with the present disclosure. Arm rest 806 includes audio jack 812 and media controller 811. A user sitting in seat 709 may listen to audio content by connecting the user's headphones (not shown) to the audio jack 812 on arm rest 806. In one embodiment, the user interface of the inflight entertainment system of the present disclosure may also be controlled by media controller 811, where media controller 811 includes a plurality of buttons 820. It is to be appreciated that media controller 811 may be coupled to set top box 702 either via hardwire connection or wirelessly. Furthermore, it is to be appreciated that user inputs using buttons 820 are provided to set top box 702 via input receiver 708.

In one embodiment of the present disclosure, controller 704 is configured such that controller 704 can detect an interruption event. An interruption event occurs when a user sitting in a seat 709 is consuming content via media device 802 and/or audio jack 812 and a global pause 410, due, for example, to an announcement 718 to be administered to the users/passengers of the aircraft will interrupt the consumption of content by the user sitting in seat 709. It is to be appreciated that controller 704 is configured such that controller 704 can determine if content is being provided to a user via display/touchscreen 814 and/or audio jack 812. Therefore, when content receiver 716 receives pause signal 410 and announcement 718, controller 704 can determine that a user is currently consuming content and the global pause 410 and announcement 718 may necessitate interrupting the user's consumption of content (i.e., pausing the video and/or audio being provided by audio/video output 710 to the user's media device 802 and/or audio jack 812).

When an interruption event is detected by controller 704, controller 704 is configured to determine, based on the contents and language of the announcement (e.g., whether the announcement is in English or another language and/or whether the announcement relates to sitting down, wearing a seatbelt, etc.) and the current state of a particular user (e.g., whether the user is wearing his/her seatbelt is sitting down, prefers English, etc.), whether the content being consumed by the user using media device 802 and/or audio jack 812 should be interrupted by the global pause 410 or if the interruption (i.e., global pause 410) should be inhibited by controller 704 for that particular user.

It is to be appreciated that controller 704 is configured such that controller 704 can determine whether an announcement relates to one or more current states of a user by determining the contents of the announcement. For example, in one embodiment, the announcements 718 are pre-recorded announcements and the announcement 718 includes an indication (such as a tag or a portion of a packet) of the contents of the announcement. Controller 704 is configured to determine, based on the indication associated with the announcement 718, the contents of the announcement. For example, a pre-recorded announcement 718 for all users/passengers on the aircraft to wear their seatbelts may be accompanied by an indication that the announcement 718 relates to a user wearing his/her seatbelt. It is to be appreciated that many more types of indications are possible in accordance with the present disclosure, such as, but not limited to, bringing a reclined backrest of a seat to an upright position, lowering an armrest that has been lifted, etc. It is to be appreciated that the indication can also relate to the language the announcement is given in. It is also to be appreciated that an announcement may include multiple indications corresponding to multiple portions of an announcement. For example, an announcement may include a first indication that a first portion of the announcement relates to a user sitting in his/her seat and a second indication that a second portion of the announcement relates to the user wearing his/her seatbelt. In this way, when controller 704 receives an announcement 718, controller 704 can determine, based on the indication, what the contents of the announcement 718 are and the language of announcement 718 is.

In another embodiment of the present disclosure, controller 704 can determine the contents of a live announcement 718 (i.e., an announcement that is being administered in real-time and has not been pre-recorded). In this embodiment, controller 704 includes voice to text recognition capabilities, where controller 704 can convert a live announcement 718 to text and determine, based on the converted text, the contents of the announcement 718. Furthermore, controller 704 is configured to determine the language of the announcement 718.

After determining the contents of the announcement 718, controller 704 is configured to determine if the content being provided to a user in a seat, such as seat 709, should be interrupted to deliver the announcement 718 (i.e., an interruption event) to the user, or if the interruption or announcement 718 of the content being provided to the user should be inhibited (i.e., the user's content should not be paused during the global pause) because the announcement does not match the current state of the user. It is to be appreciated that during a global pause, the video content provided to a user on display 814 and the audio content provided via audio jack 812 is paused and video and/or audio associated with the announcement is provided to the user, while the content the user was consuming is paused. To determine the user's current state, set top box 702 includes sensor module 706, where sensor module 706 is configured to receive signals relating to a user's current state from one or more sensors embedded in seats 709 and/or 809, as will be described below.

For example, referring again to FIG. 8, arm rest 806 includes a sensor 805, back rest 815 includes a sensor 815, and cushion 810 includes a sensor 813. Sensor 815 is disposed inside back rest 803 and is configured to sense whether back rest 803 of seat 709 has been reclined. Sensor 805 is disposed inside arm rest 806 and is configured to sense whether arm rest 806 has been lifted or lowered. It is to be appreciated that sensor 805 and sensor 815 may be any type of motion or tilt sensor for determining a change in position or tilt. For example, in one embodiment, sensors 805 and 815 may include one or more accelerometers. Sensor 813 is disposed inside cushion 810 and is configured to sense whether a user is sitting in seat 709 or not. In one embodiment, sensor 813 is a pressure sensor configured to determine that a user is sitting in seat 709 when a predetermined amount of force is continuously applied to sensor 813 in cushion 810 for a predetermined period of time. For example, in one embodiment, sensor 813 may determine that a user is sitting in seat 709 if 50 lbs. of force is applied to sensor 813 for more than 5 seconds continuously. It is to be appreciated that the force and time may be tuned for sensor 813 as desired.

Figure 10A:
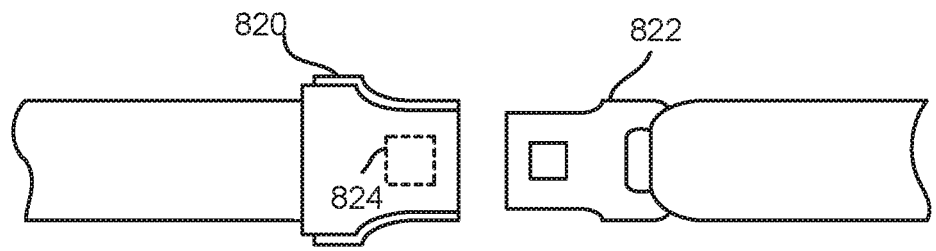
FIG. 10A is a partial view of a seatbelt in an open position in accordance with an embodiment of the present disclosure.
Figure 10B:
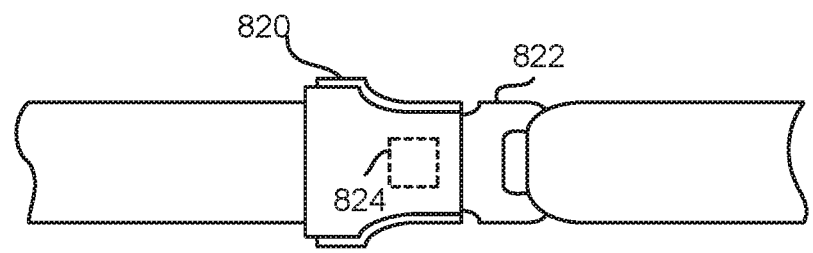
FIG. 10B is a partial view of the seatbelt of FIG. 10A in a closed position in accordance with an embodiment of the present disclosure.

In one embodiment, seatbelt 808 includes a sensor configured to determine if seatbelt 808 is fastened or unfastened. Referring to FIG. 10A, seatbelt 808 is shown in an unfastened state in accordance with the present disclosure. Referring to FIG. 10B, seatbelt 808 is shown in a fastened state in accordance with the present disclosure. As seen in FIGS. 10A and 10B, to achieve a fastened state, a plate 822 of seatbelt 808 is advanced into a buckle 820 of seatbelt 808, where plate 822 is fastened inside buckle 820 by a latch within seatbelt 808 (not shown). Sensor 824 is configured such that sensor 824 can detect when plate 822 is fasted to buckle 820. It is to be appreciated that, in one embodiment, sensor 824 is a contact sensor configured to determine that seat best 808 is in a fastened state when plate 822 makes contact with sensor 824 for a predetermined continuous period of time.

Figure 10C:
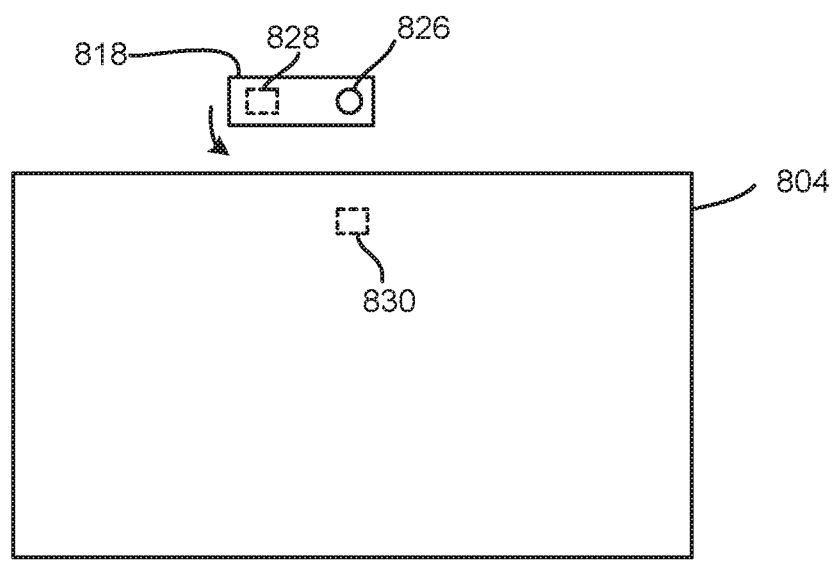
FIG. 10C is another partial view of a rear portion of a seat on an aircraft in accordance with an embodiment of the present disclosure.

In one embodiment, latch 818 and tray 804 may each include sensors configured to determine if tray 804 has been lifted and secured by latch 818. For example, referring to FIG. 10C, latch 818 is shown, where latch 818 can be pivoted about a joint 826 of latch 818 to secure tray 804. Latch 818 includes a sensor 828 and tray 804 includes a sensor 830. Sensors 828 and 830 are configured such that when latch 818 is pivoted to secure tray 804, sensor 828 may come into contact with sensor 830, and therefore sensors 828, 830 can determine that tray 804 has been lifted and secured by latch 818.

Sensors 805, 813, 815, 824, and 828/830 are each in communication with sensor module 706, where sensors 805, 813, 815, 824, and 828/830 can send signals or inputs to sensor module 706 relating the current state of a user sitting in seat 709. It is to be appreciated that sensors 805, 813, 815, 824, and 828/830 may be coupled to sensor module 706 wirelessly or via hardwire connection. In one embodiment, sensors 805, 813, 815, 824, and 828/830 send signals to sensor module 706 relating to the current state of a user sitting in seat 709 at predetermined time intervals. In another embodiment, sensors 805, 813, 815, 824, and 828/830 send signals to sensor module 706 relating to the current state of a user sitting in seat 709 after being queried by controller 704 via sensor module 706.

In this way, controller 704 can determine based on the signals relating to a user's current state, whether the content being consumed by a user should be interrupted by an announcement 718. For example, if a pause signal 410 and an announcement 718 is received by set top box 702, where the announcement 718 is related to a user sitting in seat 709 and fastening his/her seatbelt, controller 704 can query sensor 824 in seatbelt 808 and sensor 813 in cushion 810 to determine, based on the signals received by sensors 824 and 813 in response to the query, if seatbelt 808 is fastened and if a user is sitting in seat 709. If, based on the received signals, controller 704 determines that seatbelt 808 is fastened and the user is sitting in seat 709, then controller 704 can inhibit the interruption of the content being consumed by the user (i.e., the content being consumed by the user sitting in seat 709 may not be paused). As another example, if the announcement 718 is related to a user sitting in seat 709 and bringing his/her back rest 803 to an upright position and his/her hand rest 805 to a position perpendicular to back rest 815 (i.e., a lowered position, as seen in FIG. 8), controller 704 can query sensor 815 in back rest 803 and sensor 805 in arm rest 806 to determine, based on the signals received by sensor 815 and 803 in response to the query, if back rest 803 is in an upright position and hand rest 805 is in a lowered position. If, based on the received signals, controller 704 determines that back rest 803 is in an upright position and arm rest 805 is in a position perpendicular to back rest 815, then controller 704 can inhibit the interruption of the content being consumed by the user (i.e., the content being consumed by the user sitting in seat 709 may not be paused). It is to be appreciated a similar determination can be made for an announcement relating to a user lifting and securing his/her tray 804.

It is to be appreciated that, in one embodiment, controller 704 is also configured to only inhibit portions of an announcement based on a user's current state. For example, an announcement 718 may be received by set top box 702 that relates to a user sitting in his/her seat 709, fastening his/her seatbelt 808, lifting and securing his/her tray 804, and placing his/her back rest 803 in an upright position. Based on signals received by sensors 815, 813, 824, and 828/830, controller 704 can determine that only a portion of the announcement matches the current state of the user. For example, the user may be currently sitting in seat 709 with his/her seatbelt 808 fastened and his/her back rest 803 in an upright position, however, the user may not have his/her tray 804 lifted and secured. Controller 704 is configured such that based on the received signals from sensors 815, 813, 824, and 828/830, controller 704 can determine that the content being consumed by the user sitting in seat 709 should only be interrupted (i.e., paused) for the portion of the announcement relating to lifting and securing the user's tray 804.

It is also to be appreciated that, in one embodiment, controller 704 is also configured to determine the language preferences of a user sitting in a seat 709, based on the content selected to be consumed via media device 802 and/or audio jack 812. For example, when the user chooses content to consume (via touchscreen 814, buttons 816, and/or buttons 820) in a given language, for example, English, controller 704 can store the language choice of the consumed content in memory 712. In this way, if an announcement 718 is received in more than one language, for example, in English and French, controller 704 can determine that the user sitting in seat 709 is consuming content in English, and therefore, the content being consumed by the user should only be interrupted for the announcement 718 that is in English and not for the announcement 718 that is in French. It is to be appreciated that in another embodiment, a user may choose (via touchscreen 814, buttons 816, and/or buttons 820) in the user interface, which language the user prefers to receive announcements 718 in. The user's choice can then be stored in memory 712 by controller 704 and later used by controller 704 to determine which announcements or interruption events should be inhibited from interrupting the user's consumption of content.

Although in the above described embodiments when it is determined that an announcement 718 is not relevant, the announcement 718 is not provided to the user and the user's content is inhibited from being interrupted, in one embodiment of the present disclosure, a user preference to receive all announcements 718, even if the announcement 718 is not relevant to the user, may be saved in memory 712 of set top box 702. In this embodiment, set top box 702 may be configured such that, when controller 704 determines that an announcement 718 is not relevant to the user (i.e., the interruption event does not match the current state of the user), controller 704 may provide the announcement 718 to the user while concurrently providing the content the user was consuming, however, controller 704 may provide the announcement 718 at a lower volume than the content being consumed by the user. Furthermore, if announcement 718 contains any messages to be displayed along with announcement 718 on display 814, the message may be displayed in an overlay on top of the visual content being consumed by the user via display 814. It is to be appreciated that, in one embodiment, the overlay may be displayed semi-transparently, so that a user can decipher the contents of the message while still being able to view the content displayed on display 814.

It is to be appreciated that, in some embodiments, some or all of the components of set top box 702 may be included in main controller 105 and/or switch 107, shown in FIGS. 1-3 and described above. Furthermore, it is to be appreciated that, in some embodiments, some or all of the components of set top box 702 may be included in display device 802.

Figure 11:
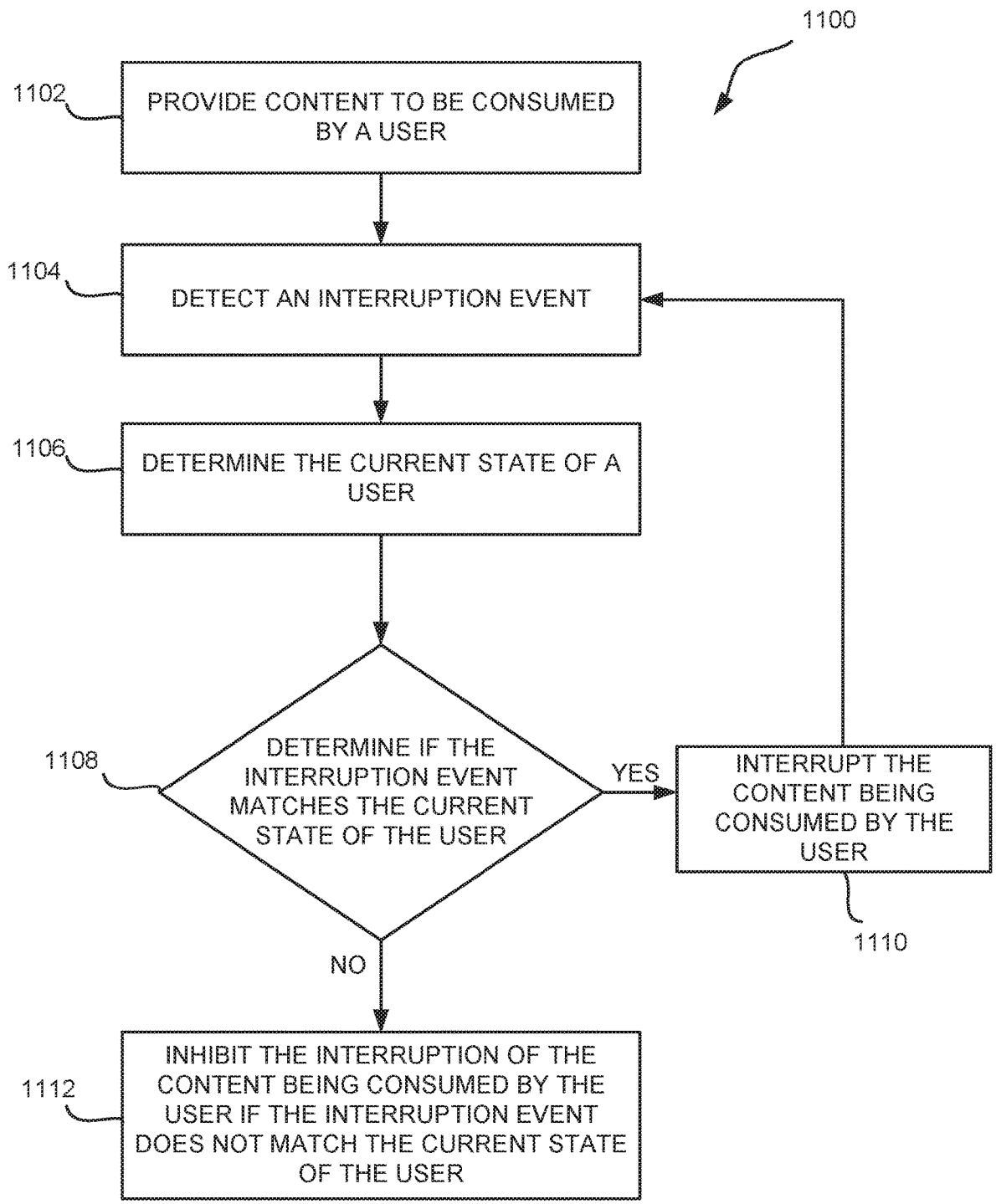
FIG. 11 illustrates an exemplary flow diagram of a method for inhibiting an interruption of content being consumed by a user in accordance with an embodiment of the present disclosure.

Referring to FIG. 11, an exemplary method 1100 for inhibiting the interruption of the content being consumed by a user is shown in accordance with the present disclosure. Initially, content received via content receiver 716 or accessed via portable media device interface 714 is provided to a user sitting in a seat 709 via controller 704 and audio/video output 710, in step 1102. Then, controller 704 in set top box 702 may detect an interruption event (e.g., global pause signal 410 and/or announcement 718 that would interrupt the consumption of content by a user sitting in a seat 709 of the aircraft), in step 1104. Then, controller 704 may determine the current state of the user, in step 1108. For example, as described above, controller 704, based on the contents of the announcement 718, may query one or more of sensors 805, 813, 815, 824, and 828/830 to determine the current state of the user. Then, controller 704 may determine if the interruption event matches the current state of the user, in step 1108. For example, as described above, if the interruption event is an announcement 718 for a user sitting in seat 709 to fasten his/her seatbelt 808, controller 704 can determine if the interruption event (fasten seatbelt 808) matches the current state of the user (i.e., the user's seatbelt 808 is, or is not, in a fastened state, as detected by sensor 824). As another example, if the interruption event is an announcement 718 that is in a first language, controller 704 can determine, based on user inputs received by input receiver 708 (e.g., when the user chose which language to consume content in), if the interruption event (i.e., an announcement in a first language) matches the current state of the user (i.e., the language the user is consuming content in). It is to be appreciated that the determination made in step 1106 by controller 704 is based on inputs received via sensor module 706 and/or input receiver 708. If controller 704 determines that the interruption event matches the current state of the user, in step 1108, then, controller 704 may interrupt the consumption of content by the user (i.e., the content provided to the user may be paused and the announcement may be provided to the user), in step 1110. However, if controller 704 determines that the interruption event does not match the current state of the user, in step 1108, then controller 704 may inhibit the interruption of the content being consumed by the user (i.e., the content being provided to the user may not be paused), in step 1112. In one embodiment, if the content is interrupted in step 1110, the controller 704 may revert to step 1104 to determine if the interruption event has ended. When the interruption event ends, the controller 704 may resume the providing of content.

It is to be appreciated that, as stated above, an interruption event may comprise an announcement 718 relating to more than one current state of a user. For example, an announcement 718 may include a first portion related to a user sitting in his/her seat (i.e., a first current state of the user) and a second portion related to a user wearing his/her seat belt (i.e., a second current state of the user). In step 1104, controller 704 may detect an interruption event comprising an announcement including at least a first portion related to a first current state of the user (e.g., a user sitting in his/her seat) and a second portion related to a second current state of the user (e.g., a user wearing his/her seat belt). Then, in step 1106, controller 704 can determine the first current state of the user (e.g., whether the user is sitting in his/her seat) and a second current state of the user (e.g., whether the user is wearing his/her seat belt) based on inputs received from sensor module 706 and/or user input receiver 706. In step 1108, controller 704 can determine if the first portion of the announcement matches the first current state of the user and if the second portion of the announcement matches the second current state of the user. If controller 704 determines that the first portion of the announcement matches the first current state of the user and the second portion of the announcement matches the second current state of the user, controller 704 may interrupt the consumption of content by the user (i.e., the content being provided to the user may be pause and the first and second portions of the announcement may be provided to the user), in step 1110. However, if controller 704 determines that either the first portion of the announcement does not match the first current state of the user or the second portion of the announcement does not match the second current state of the user, controller 704 may inhibit the interruption of the content being consumed by the user for the portion of the announcement matching the current state of the user (step 1112) and interrupt the content being consumed by the user for the portion of the announcement matching the current state of the user (step 1110).

It is to be appreciated that the various features shown and described are interchangeable, that is a feature shown in one embodiment may be incorporated into another embodiment.

Although embodiments which incorporate the teachings of the present disclosure have been shown and described in detail herein, those skilled in the art can readily devise many other varied embodiments that still incorporate these teachings. Having described preferred embodiments of a method and apparatus for inhibiting the interruption of content being consumed by a user (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the disclosure.

What is claimed is:

1. A method for controlling interruption of media content in a passenger seating area, the method comprising:
receiving media content being consumed by a user in the passenger seating area;
detecting an interruption event that comprises a live or pre-recorded public announcement from a crew member of the vehicle;
detecting a current state of the user in the passenger seating area by one or more sensors;
determining if the interruption event is relevant to the current state of the user;
interrupting the media content being consumed by the user if the interruption event is relevant to the current state of the user; and
inhibiting the interruption of the media content being consumed by the user if the interruption event is not relevant to the current state of the user.

2. The method of claim 1, wherein the interruption event is an announcement to fasten a seatbelt.

3. The method of claim 2, wherein the current state of the user is having the user's seatbelt in a fastened state.

4. The method of claim 1, wherein the interruption event is an announcement to be seated.

5. The method of claim 4, wherein the current state of the user is the user sitting in the user's seat.

6. The method of claim 1, wherein the interruption event is an announcement to lift and secure a tray.

7. The method of claim 6, wherein the current state of the user is the user's tray being in a lifted and secured state.

8. The method of claim 1, wherein the interruption event is an announcement to place a back rest of a seat in an upright position.

9. The method of claim 8, wherein the current state of the user is the user's back rest being in an upright position.

10. The method of claim 1, wherein the interruption event is an announcement to lower an arm rest of a seat.

11. The method of claim 10, wherein the current state of the user is the user's arm rest being in a lowered position.

12. The method of claim 1, wherein the interruption event is an announcement in a first language.

13. The method of claim 12, wherein the current state of the user is consuming content in a second language, the second language being a different language than the first language.

14. The method of claim 1, wherein the interruption event is an announcement, the announcement including at least a first portion related to a first current state of the user and a second portion related to a second current state of the user.

15. The method of claim 1, further comprising:
determining the first current state of the user; determining the second current state of the user;
determining if the first portion of the announcement is relevant to the first current state of the user;
determining if the second portion of the announcement is relevant to the second current state of the user;
inhibiting the interruption of content being consumed by the user for the first portion of the announcement if the first portion of the announcement does not match the first current state of the user; and
interrupting the content being consumed by the user for the second portion of the announcement if the second portion of the announcement is relevant to the second current state of the user.

16. The method of claim 1, wherein interruption event is an announcement and the inhibiting further comprises providing the announcement concurrently with the content being consumed by the user, the announcement provided at a lower volume than the content being consumed by the user.

17. The method of claim 1, wherein the current state of the user is determined based on at least one input received by one of an input receiver (740 and a sensor module.

18. An apparatus for controlling interruption of media content in a passenger seating area, the apparatus comprising:
a content receiver that receives media content to be consumed by a user in the passenger seating area of a vehicle from at least one source; and
a controller coupled to the content receiver, wherein the controller provides the media content consumed by the user to an output circuit that outputs the content to the user, detects an interruption event that comprises a live or pre-recorded public announcement from a crew member of the vehicle,
determines detects a current state of the user in the passenger seating area by one or more sensors,
determines if the interruption event is relevant to the current state of the user,
interrupts the media content to be consumed by the user if the interruption event is relevant to the current state of the user, and
inhibits the interruption of the media content being consumed by the user if the interruption event is not relevant to the current state of the user.

19. The apparatus of claim 18, wherein the interruption event is an announcement to fasten a seatbelt.

20. The apparatus of claim 19, wherein the current state of the user is having the user's seatbelt in a fastened state.

21. The apparatus of claim 18, wherein the interruption event is an announcement to be seated.

22. The apparatus of claim 21, wherein the current state of the user is the user sitting in the user's seat.

23. The apparatus of claim 18, wherein the interruption event is an announcement to lift and secure a tray.

24. The apparatus of claim 23, wherein the current state of the user is the user's tray being in a lifted and secured state.

25. The apparatus of claim 18, wherein the interruption event is an announcement to place a back rest of a seat in an upright position.

26. The apparatus of claim 25, wherein the current state of the user is the user's back rest being in an upright position.

27. The apparatus of claim 18, wherein the interruption event is an announcement to lower an arm rest of a seat.

28. The apparatus of claim 27, wherein the current state of the user is the user's arm rest being in a lowered position.

29. The apparatus of claim 18, wherein the interruption event is an announcement in a first language.

30. The apparatus of claim 29, wherein the current state of the user is consuming content in a second language, the second language being a different language than the first language.

31. The apparatus of claim 18, wherein the interruption event is an announcement, the announcement including at least a first portion related to a first current state of the user and a second portion related to a second current state of the user.

32. The apparatus of claim 31, wherein the controller:
determines the first current state of the user and the second current state of the user;
determines if the first portion of the announcement is relevant to the first current state of the user;
determines if the second portion of the announcement is relevant to the second current state of the user;
inhibits the interruption of content being consumed by the user for the first portion of the announcement if the first portion of the announcement does not match the first current state of the user; and
interrupts the content being consumed by the user for the second portion of the announcement if the second portion of the announcement is relevant to the second current state of the user.

33. The apparatus of claim 18, wherein interruption event is an announcement and controller provides the announcement concurrently with the content being consumed by the user to the outputcircuit, the output circuit providing the announcement at a lower volume than the content being consumed by the user.

34. The apparatus of claim 18, further comprising an input receiver that receives user inputs and a sensor module that receives inputs from at least one sensor, the input receiver and the sensor module each coupled to the controller, wherein the controller determines the current state of the user based on at least one input received from the input receiver or the sensor module.

* * * * *